United States Patent
Sitomaniemi et al.

(10) Patent No.: US 8,085,714 B2
(45) Date of Patent: Dec. 27, 2011

(54) METHOD, APPARATUS AND COMPUTER PROGRAM PRODUCT FOR PRESERVING A SIGNALLING CONNECTION

(76) Inventors: Jaakko Johannes Sitomaniemi, Oulu (FI); Marko Mikael Kukkohovi, Oulunsalo (FI)

( * ) Notice: Subject to any disclaimer, the term of this patent is extended or adjusted under 35 U.S.C. 154(b) by 604 days.

(21) Appl. No.: 12/240,364

(22) Filed: Sep. 29, 2008

(65) Prior Publication Data

US 2009/0086667 A1    Apr. 2, 2009

Related U.S. Application Data

(60) Provisional application No. 60/976,416, filed on Sep. 29, 2007.

(51) Int. Cl.
*H04Q 7/00*    (2006.01)
*H04L 12/66*    (2006.01)

(52) U.S. Cl. ........................ 370/328; 352/410

(58) Field of Classification Search ................ None
See application file for complete search history.

(56) References Cited

U.S. PATENT DOCUMENTS

| | | | |
|---|---|---|---|
| 2001/0018342 A1* | 8/2001 | Vialen et al. | 455/423 |
| 2003/0003895 A1* | 1/2003 | Wallentin et al. | 455/410 |
| 2004/0219921 A1* | 11/2004 | Cao et al. | 455/444 |
| 2006/0089137 A1* | 4/2006 | Howell et al. | 455/423 |
| 2009/0042560 A1* | 2/2009 | Islam et al. | 455/423 |
| 2009/0129339 A1* | 5/2009 | Young et al. | 370/331 |
| 2011/0013589 A1* | 1/2011 | Wu | 370/331 |
| 2011/0038347 A1* | 2/2011 | Patil et al. | 370/331 |

* cited by examiner

*Primary Examiner* — Andrew Lee

(57) ABSTRACT

A method, apparatus, and computer program product are provided for preserving a signaling connection after a network has indicated that the signaling connection can be closed, such as by selection of a no follow on proceed mode during routing area updates or attach procedures. By preserving the signaling connection, subsequent communications between the network and the user equipment can be completed without closing and then subsequently reopening the signaling connection.

24 Claims, 6 Drawing Sheets

METHOD, APPARATUS AND COMPUTER PROGRAM PRODUCT FOR PRESERVING A SIGNALLING CONNECTION

CROSS REFERENCE TO RELATED APPLICATIONS

The present application claims priority to U.S. Provisional Application No. 60/976,416 filed Sep. 29, 2007, the contents of which are incorporated by reference herein in their entirety.

TECHNOLOGICAL FIELD

Embodiments of the present invention relate generally to communications between a network and a mobile terminal and, more particularly, relate to a method, apparatus and computer program product for preserving a signaling connection, or other connection.

BACKGROUND

Many modern communications networks utilize packet switched (PS) signaling to transmit and receive data between devices, such as between mobile terminals and various network devices. In order to utilize a PS signaling scheme, a PS signaling connection can be obtained between a mobile terminal and the network. In order to obtain a PS signaling connection, a session establishment procedure generally initially takes place between the mobile terminal and the network. For example, a session establishment procedure can be a network initiated paging procedure or a mobile terminal initiated service request procedure. Each session establishment procedure can consume network resources and, as such, avoiding unnecessary session establishment procedures is desirable.

By way of example, the technical specifications of the Third Generation Partnership Project (3GPP) and, in particular, 3GPP TS 24.008, REL 6 and REL 7A (hereinafter the 3GPP specification) describe an approach for either maintaining or releasing a PS connection following general packet radio service (GPRS) attach and routing area update procedures. In this regard, third generation (3G) networks use a follow on proceed bit in the attach result and update result information to indicate whether the PS connection should be maintained or released. If the follow on proceed mode is selected, such as in instances in which PS signaling is anticipated, the PS signaling connection will remain open following the GPRS attach and routing area update procedures, thereby avoiding the network resource consumption otherwise required to close the connection that was established for the GPRS attach and routing area update procedure only to have to reestablish a connection to support the impending PS signaling. On the other hand, if the follow on proceed bit is set in a no follow on proceed mode, such as in instances in which PS signaling is not anticipated, the connection between the mobile terminal and the network will be automatically released. In this mode, a timer, referred to as T3340 in the 3GPP specification, is set and the PS signaling connection only remains open until the timer expires. When the timer expires, for example after ten seconds, the mobile terminal notifies the network's radio resource controller (RRC), and the RRC releases the PS signaling connection.

As noted above, the no follow on proceed mode is generally selected in instances in which there is no known need for further PS signaling. Since the PS signaling connection remains open for a period of time, such as the duration of a timer, even when the no follow on proceed mode is selected, PS signaling can be exchanged between the mobile terminal and the network during this period of time, that is, while the timer is running. However, when the timer expires, any ongoing or impending PS signaling is interrupted by the mobile terminal's initiation of a release of the connection. As a result, a new connection must be established to support or complete the PS signaling. The establishment of a new connection can lead to unnecessary utilization of network resources and, in some instances, latency. In a 3G network, for example, this situation may arise because, even though signaling by the mobile terminal may be prohibited while timer T3440 is active, the network may still initiate communications with the mobile terminal. For example, a session management procedure could be initiated by the network which would be ongoing at the time that the timer expires and the connection is closed.

FIG. 1 depicts a signaling sequence in which the no follow on proceed mode is selected by the network since no data or session management/GPRS mobility management protocol data units (SM/GMM PDUs) need to be sent to the mobile terminal at the time the network is accepting the routing area update request, thereby causing subsequent PS signaling to be interrupted. The signaling sequence depicts communications between a mobile terminal, also known as user equipment, 100 and a network 105. Prior to event 125, a session has been established and a PS signaling connection has been opened between the user equipment 100 and the network 105. At event 125, a routing area update request is sent from the user equipment 100 to the network 105. Upon receipt of this request, the network 105 transmits a routing area update accept at 130. Additionally, at 130, the network sets the follow on proceed bit 115 to reflect the no follow on proceed mode. Accordingly, timer 110 is triggered at the user equipment 100. Before timer 110 expires at 145, an initial Internet Protocol (IP) data packet, which is part of a larger group of IP data packets, is sent to the user equipment 100 at 135. Timer 110 then expires at 145, before the entire group of IP data packets is sent or received by the user equipment 100. Also at 145, the user equipment 100 interrupts the reception and transmission of the IP data packets and initiates a release of the PS signaling connection. Accordingly, the RRC releases the PS signaling connection at 150. Since some of the group of IP data packets have yet to be sent or received by user equipment 100, a new session establishment must occur at 155. Subsequently, the remaining packets of the group of IP data can then be sent or received at 160, 165, and 170.

Thus, the signaling sequence of FIG. 1 depicts a scenario where a PS signaling connection is released, and then must be reestablished even though additional PS signaling commenced prior to the release, since the initial selection of the no follow on proceed mode initiates the automatic release of the connection following the expiration of the timer. In this scenario, the release and reestablishment procedures unnecessarily utilize resources of both the user equipment and the network, and may impair the end user's experience, or quality of service, due to potentially increased latency in the data transfer.

Accordingly, it may be advantageous to provide an improved mechanism for avoiding unnecessary release and reestablishment procedures by maintaining an open PS signaling connection in certain circumstances including, for example, when additional PS signals are transmitted following the selection of a no follow on proceed mode.

BRIEF SUMMARY

A method, apparatus and computer program product are therefore provided to avoid, in some embodiments, unnecessary release and reestablishment procedures by maintaining an open PS signaling connection in certain circumstances including, for example, in instances in which additional PS signaling is commenced following an indication by the network that the connection should be closed, such as by the network's selection of a no follow on proceed mode, but prior to actual release of the connection. In one embodiment, a method, apparatus and computer program are provided that halt the timer that is started in response to the selection of the no follow on proceed mode if additional PS signaling is commenced prior to the expiration of the timer so as to thereby permit completion of the additional PS signaling. By stopping the timer in accordance with this embodiment, a PS signaling connection release and reestablishment cycle can be avoided, while permitting the PS signaling to be completed in an efficient manner.

In one exemplary embodiment, a method for preserving a signaling connection is provided. The exemplary method may include receiving a signal connection release mode indication. In this regard, the signal connection release mode indication may be associated with a signaling connection of a mobile terminal. The exemplary method may also include initiate a timer based on the signal connection release mode indication, wherein upon expiration of the timer, the signaling connection will be closed. Further, the exemplary method may include receiving at least a portion of a subsequent communication prior to expiration of the timer, and halting the timer in response to receipt of the at least a portion of the subsequent communication to prevent expiration of the timer and to correspondingly disallow closing of the signaling connection.

In another exemplary embodiment, an apparatus for preserving a signaling connection is provided. The exemplary apparatus may include a processor. The processor may be configured to receive a signal connection release mode indication. In this regard, the signal connection release mode indication may be associated with a signaling connection. The processor may also be configured to initiate a timer based on the signal connection release mode indication, wherein upon expiration of the timer, the signaling connection will be closed. Further, the processor may be configured to receive at least a portion of a subsequent communication prior to expiration of the timer, and halt the timer in response to receipt of the at least a portion of the subsequent communication to prevent expiration of the timer and to correspondingly disallow closing of the signaling connection.

In yet another exemplary embodiment, a computer program product for preserving a signaling connection is provided. The computer program product may comprise at least one computer-readable storage medium having executable computer-readable program code instructions stored therein. The computer-readable program code instructions may include first program code instructions configured to receive a signal connection release mode indication. In this regard, the signal connection release mode indication being associated with a signaling connection. Second program code instructions may be configured to initiate a timer based on the signal connection release mode indication, wherein upon expiration of the timer, the signaling connection will be closed. Further, third program code instructions configured to receive at least a portion of a subsequent communication prior to expiration of the timer, and fourth program code instructions configured to halt the timer in response to receipt of the at least a portion of the subsequent communication to prevent expiration of the timer and to correspondingly disallow closing of the signaling connection.

In another exemplary embodiment, an apparatus for preserving a signaling connection may be means for receiving a signal connection release mode indication. In this regard, the signal connection release mode indication may be associated with a signaling connection. The exemplary apparatus may also include means for initiating a timer based on the signal connection release mode indication, wherein upon expiration of the timer, the signaling connection will be closed. Further, the exemplary apparatus may include means for receiving at least a portion of a subsequent communication prior to expiration of the timer, and means for halting the timer in response to receipt of the at least a portion of the subsequent communication to prevent expiration of the timer and to correspondingly disallow closing of the signaling connection.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
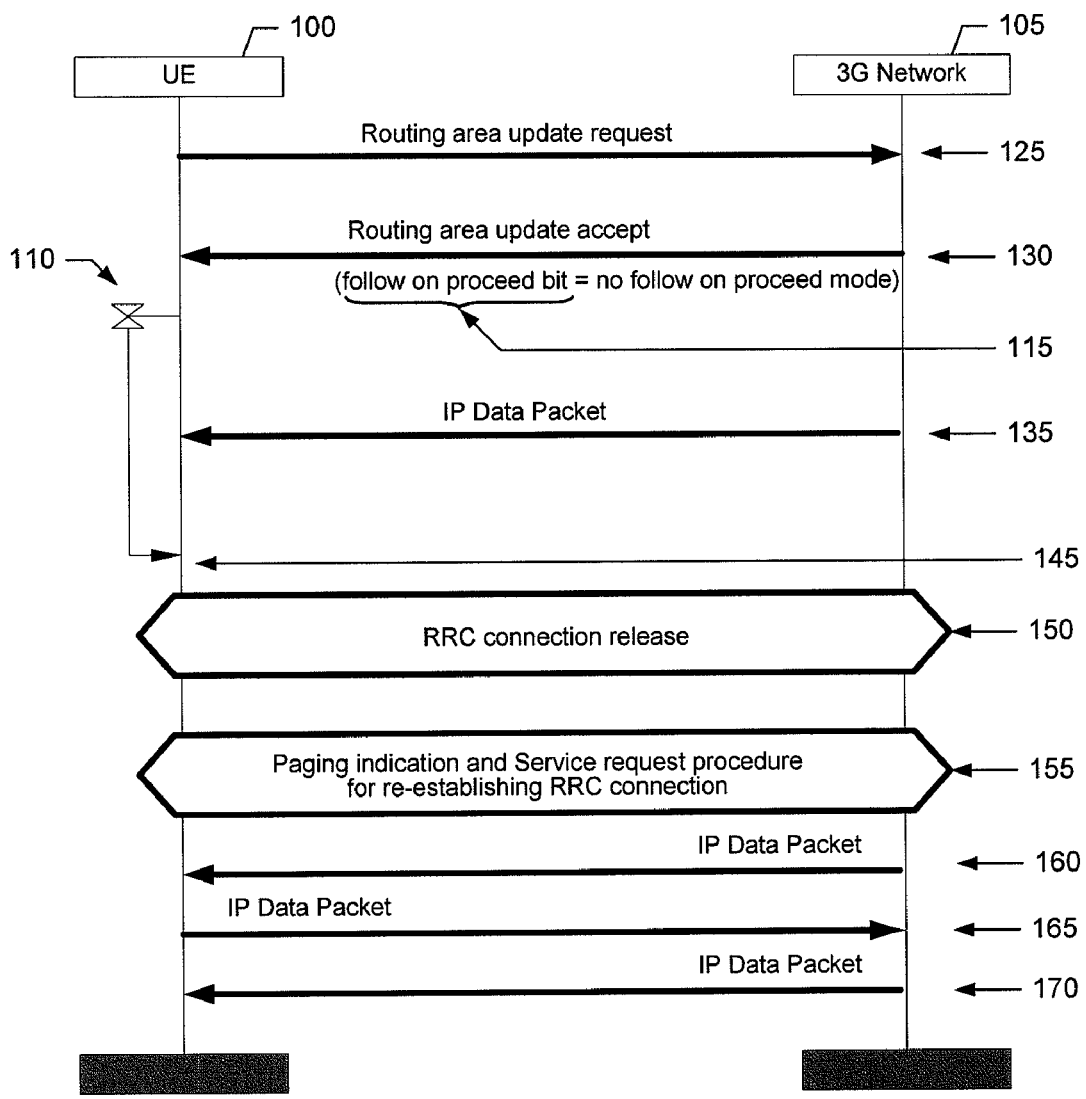
FIG. 1 is a conventional signaling sequence.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Figure 2:
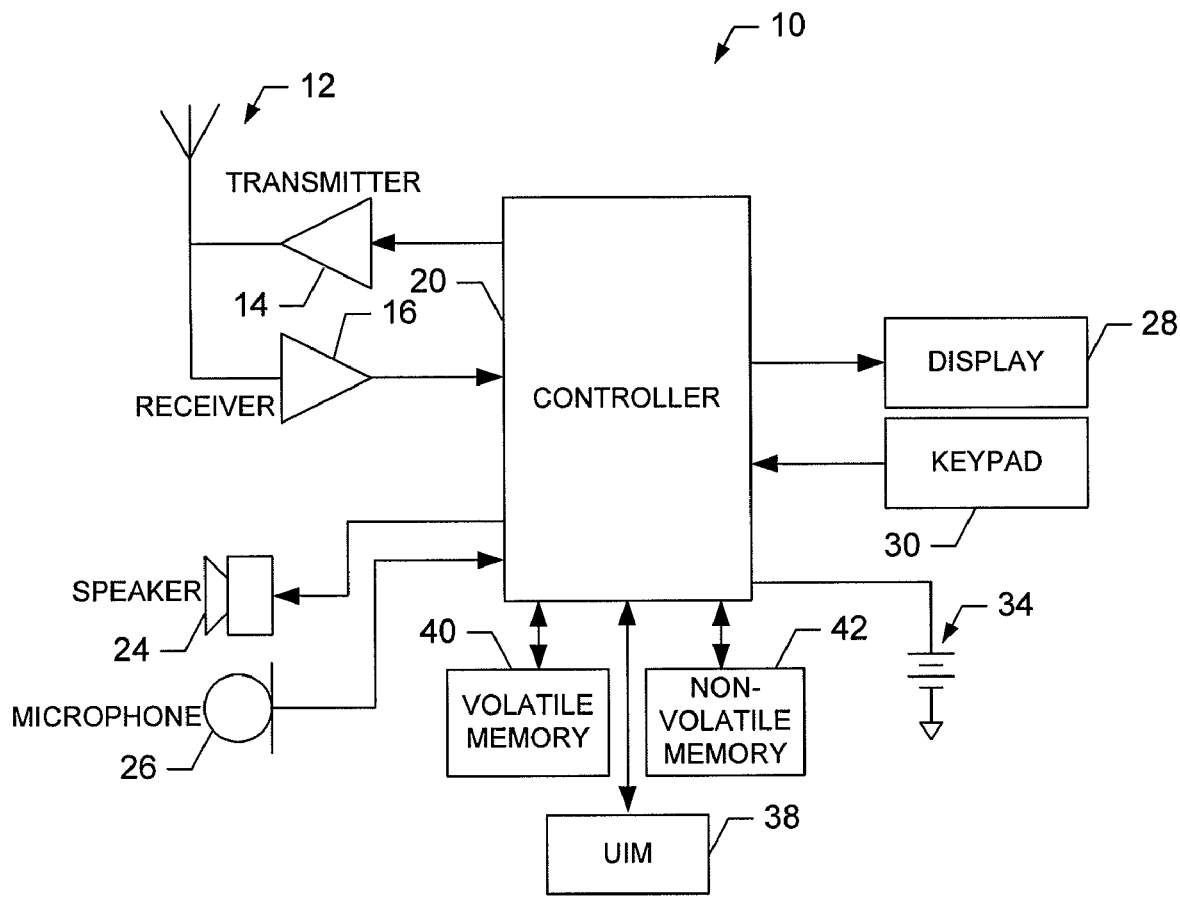
FIG. 2 is a schematic block diagram of a mobile terminal according to an exemplary embodiment of the present invention.

FIG. 2 illustrates a block diagram of a mobile terminal 10 that may benefit from embodiments of the present invention. It should be understood, however, that a mobile telephone as illustrated and hereinafter described is merely illustrative of one type of mobile terminal (also known as user equipment) that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, Global Positioning System (GPS) devices and other types of voice and text communications systems, can readily employ embodiments of the present invention. Furthermore, devices that are not mobile may also readily employ embodiments of the present invention.

Embodiments of the present invention will be primarily described below in conjunction with mobile communications applications. However, it should be understood that embodiments of the present invention can be utilized in conjunction with a variety of other applications, both in the mobile communications industries and outside of the mobile communications industries.

The mobile terminal 10 may include an antenna 12 (or multiple antennae) in operable communication with a transmitter 14 and a receiver 16. The mobile terminal 10 may further include an apparatus, such as a controller 20 or other processing element, that may provide signals to and receive signals from the transmitter 14 and receiver 16, respectively. The signals may include signaling information in accordance with the air interface standard of the applicable cellular system, and also user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 may include means, such as circuitry, desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which may be coupled to the controller 20. The user input interface, which may allow the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 may further include a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 may be a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber. In addition to the UIM 38, the mobile terminal 10 may be equipped with memory. For example, the mobile terminal 10 may include volatile memory 40, such as volatile Random Access Memory (RAM), which may include a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 3:
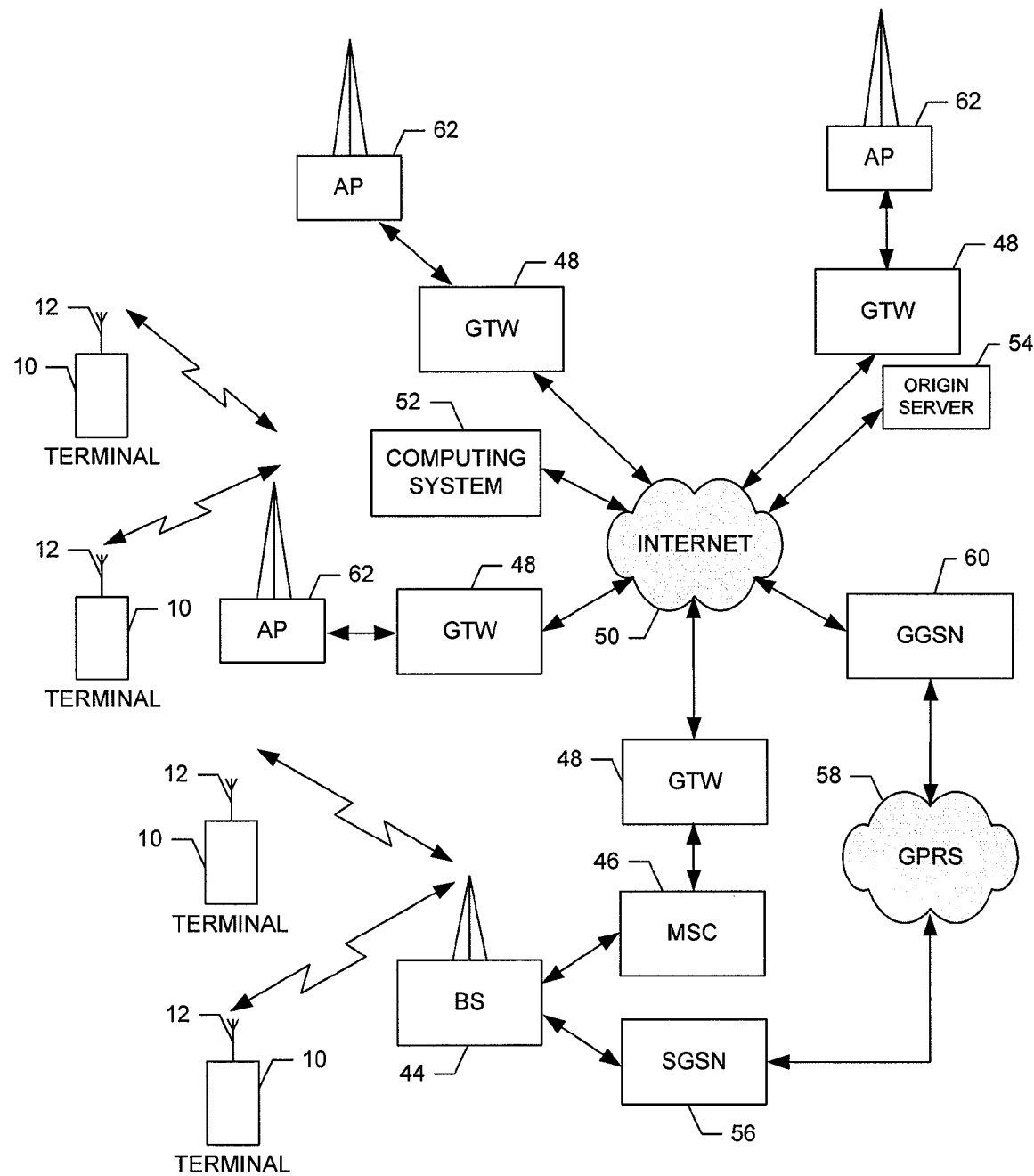
FIG. 3 is a schematic block diagram of a wireless communications system according to an exemplary embodiment of the present invention.

FIG. 3 is a schematic block diagram of a wireless communications system according to an exemplary embodiment of the present invention. In this regard, FIG. 3 is an illustration of one type of system that may benefit from embodiments of the present invention is provided. The system may include a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 3, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In some embodiments, however, the MSC 46 may be coupled to a gateway device (GTW) 48, and the GTW 48 may be coupled to a WAN, such as the Internet 50. In turn, devices such as processing elements (e.g., personal computers, server computers, or the like) can be coupled to the mobile terminal 10 via the Internet 50. For example, as explained below, the processing elements can include one or more processing elements associated with a computing system 52, origin server 54, and/or the like, as described below.

The BS 44 can also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 may be coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content, or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, and/or any of a number of other devices, to the Internet 50, the mobile terminals 10 can communicate with one another, the computing system, 52, the origin server 54, etc., to thereby carry out various functions of the mobile terminals 10, such as to transmit data, content or the like to, and/or receive content, data or the like from, the computing system 52, and/or the origin server 54, etc.

Although not shown in FIG. 3, in addition to or in lieu of coupling the mobile terminal 10 to computing systems across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing system 52, can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals).

Figure 4:
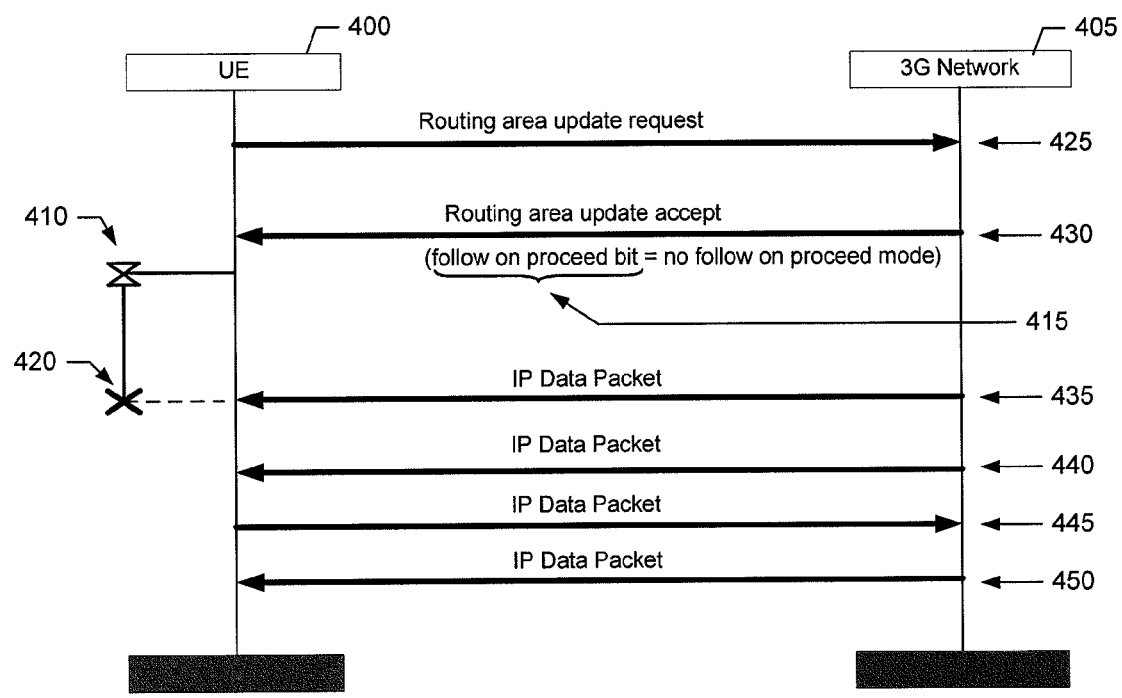
FIG. 4 is a signaling sequence according to an exemplary embodiment of the present invention.

FIG. 4 depicts an exemplary signaling sequence in accordance with exemplary embodiments of the invention in which subsequent data communications may be permitted to be completed and need not be interrupted, even though the network previously indicated, such as following a GPRS attach and routing update, that the connection was to be released. For purposes of illustration but not of limitation, the embodiment of FIG. 4 is described in the context of a 3G network and uses similar terminology to that used by the 3GPP specification. However, it is contemplated that embodiments of the disclosed invention can be utilized in a wide variety of other contexts including in networks that are not 3G networks. Thus, FIG. 4 and the corresponding textual description are merely provided for exemplary purposes.

The signaling sequence of FIG. 4 depicts communications between a user equipment 400 and a network 405. In some embodiments, user equipment 400 can be mobile terminal 10 of FIG. 2 and network 405 can be the network of FIG. 3 and, in particular, the SGSN 56 of FIG. 3. Prior to event 425, a session has been established with a PS signaling connection being opened between user equipment 400 and network 405. Note that a PS signaling connection is used here merely as an exemplary connection, and it is contemplated that other types of signaling and/or data connections can be utilized. At event 425, a routing area update request can be sent from the user equipment 400 to network 405. Upon receipt of this request, network 405 can transmit a routing area update accept at 430. Additionally, at 430, the network provides an indication as to whether the signaling connection should remain open or be closed. In the illustrated example, a follow on proceed bit 415 can be set to indicate either a follow on proceed mode or a no follow on proceed mode. As described above, in instances in which the network desires to maintain the signaling connection open, such as in instances in which subsequent PS signaling is anticipated, the network sets the follow on proceed bit 415 to indicate a follow on proceed mode. However, in instances in which the network does not anticipate further PS signaling, the network can set the follow on proceed bit 415 to indicate a no follow on proceed mode. As a result of user equipment 400 being set to a no follow on proceed mode, timer 410 of the illustrated embodiment can be triggered. In some embodiments, timer 410 can be timer T3340 referred to in the 3GPP specification. Timer 410 can be configured such that when the timer expires (e.g., times up to a threshold or times down to a threshold), the user equipment 400 will automatically initiate a release of the PS signaling connection. For example, when the timer expires, the user equipment 400 can notify an RRC, and the RRC can release the PS signaling connection. In some embodiments, timer 410 can be set to expire in ten seconds, although other predefined time periods may be employed.

Referring again to FIG. 4, before the timer 410 expires, PS signaling or other data communications may commence, even though such PS signaling or other data communications was generally unanticipated at the time that the network elected to close the connection by selecting the no follow on proceed mode. For example, an Internet Protocol (IP) data packet, which is part of a larger group of IP data packets, can be sent to the user equipment 400 at 435. In accordance with embodiments of the present invention, the transmission of IP data packets or other types of data transmission during the period of time in which the time is counting down causes the timer to be halted, thereby avoiding the closing of the connection and the interruption of the transmission of the IP data packets that otherwise would have occurred upon the expiration of the timer; generally at least until the data transmission is completed. In some embodiments, when the first of a group of IP data packets is received by user equipment 400, timer 410 can be stopped at 420. Additionally, in some embodiments, the timer 410 can be stopped by the transmitting of an IP data packet by the user equipment 400. It is also contemplated that any type of data transmission or reception by the user equipment 400, such as for example uplink data packets, downlink data packets, GPRS mobility management/session management NAS (GMM/SM NAS), etc., can cause timer 410 to be halted. Since timer 410 is stopped, the timer 410 cannot expire, and thus timer 410 cannot initiate a release of the PS signaling connection. As such, the existing PS signaling connection can be utilized to send or receive the remaining IP data packets in the group of IP data packets at 440, 445, and 450.

Figure 5:
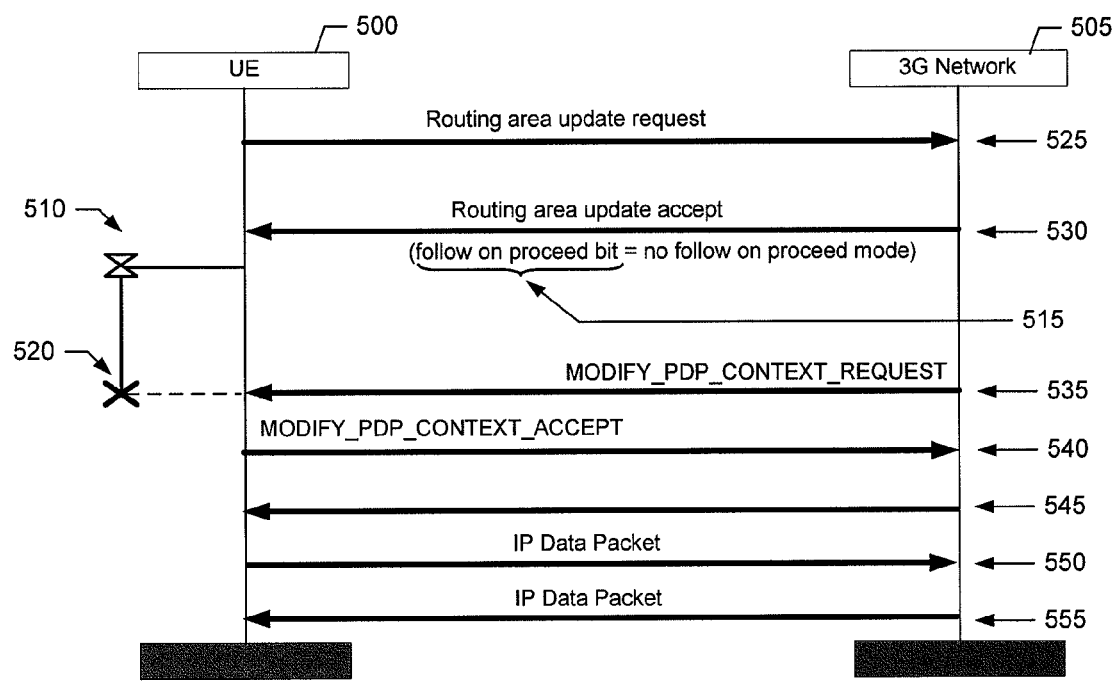
FIG. 5 is a signaling sequence according to another exemplary embodiment of the present invention.

FIG. 5 depicts another exemplary signaling sequence in accordance with an embodiment of the invention where a data reception that commences after the network has indicated that the connection is to be released is not interrupted, but is, instead, completed by maintaining the connection between the network and the user equipment open. For purposes of illustration but not of limitation, the embodiment of FIG. 5 is also described in the context of a 3G network and uses similar terminology to that used by the 3GPP specification. However, it is contemplated that embodiments of the disclosed invention can be utilized in a wide variety of other contexts including in networks that are not 3G networks. Thus, FIG. 5 and the corresponding textual description are merely provided for exemplary purposes.

The signaling sequence of FIG. 5 depicts communications between a user equipment 500 and a network 505. In some embodiments, user equipment 500 can be mobile terminal 10 of FIG. 2 and network 505 can be the network of FIG. 3 and, in particular, the SGSN 56 of FIG. 3. Prior to event 525, a session has been established and a PS signaling connection has been opened between user equipment 500 and network 505. Note that a PS signaling connection is used here merely as an exemplary connection, and it is contemplated that other types of signaling and/or data connections can be utilized. At event 525, a routing area update request can be sent from the user equipment 500 to network 505. Upon receipt of this request, network 505 can transmit a routing area update accept at 530. Additionally, at 530, the network provides an indication as to whether the signaling connection should remain open or be closed. In the illustrated example, a follow on proceed bit 515 can be set to indicate either a follow on proceed mode or a no follow on proceed mode. As described above, in instances in which the network desires to maintain the signaling connection open, such as in instances in which subsequent PS signaling is anticipated, the network sets the follow on proceed bit 515 to indicate a follow on proceed mode. However, in instances in which the network does not anticipate further PS signaling, the network can set the follow on proceed bit 515 to indicate a no follow on proceed mode. As a result of user equipment 500 being set to a no follow on proceed mode, timer 510 can be triggered. In some embodiments, timer 510 can be timer T3340 referred to in the 3GPP specification. Timer 510 can be configured such that when the timer expires (e.g., times up to a threshold or times down to a threshold), the user equipment 500 will initiate a release of the PS signaling connection. For example, when the timer expires, the user equipment 500 can notify an RRC, and the RRC can release the PS signaling connection. In some embodiments, timer 510 can be set to expire in ten seconds, although other predefined time periods can be employed.

Referring again to FIG. 5, before the timer 510 expires, a modify packet data protocol (PDP) context request or session management PDU (or other signal(s) indicative of a desire for further communication) can be sent to the user equipment 500. In accordance with embodiments of the present invention, the transmission of a modify PDP context request or session management PDU or the like during the period of time in which the time is counting down causes the timer to be halted, thereby avoiding the closing of the connection and the interruption of the ongoing communication that otherwise would have occurred upon the expiration of the timer; generally at least until the ongoing communication is completed. In some embodiments, when a modify PDP context request or session management PDU is received by user equipment 500, timer 510 can be stopped at 520. Since timer 510 is stopped, the timer 510 cannot expire, and thus timer 510 cannot initiate a release of the PS signaling connection. As such, the existing PS signaling connection can be utilized to complete the ongoing sequence of communications, including, for example, the transmission of a modify PDP context accept at 540. Additionally, the existing PS signaling connection can be utilized to send or receive IP data packets, or any other type of data, at 545, 550, and 555.

Another exemplary embodiment of the invention can be utilized in a second generation/third generation inter-system handover (2G3G ISHO). In a situation where a SGSN has no data to be sent to a user equipment at the time it responds to the user equipment's routing area update request, the SGSN may reply with routing area update accept and set the follow on proceed bit to a no follow on proceed mode and trigger a timer. Additionally, the SGSN may wait for a routing area update complete message from the user equipment. The SGSN may later receive data that can be sent to the user equipment before the routing area complete message is received. When the data is sent, the timer can be stopped in accordance with embodiments of the invention and transmission or reception can be completed without interruption by the timer in a comparable manner to that described above. As such, the network can have a mechanism to indicate to the user equipment that the desire for ongoing communications has changed since the no follow on proceed mode was selected, for example when new data is being sent, and the PS signaling or other data connection can be preserved.

Figure 6:
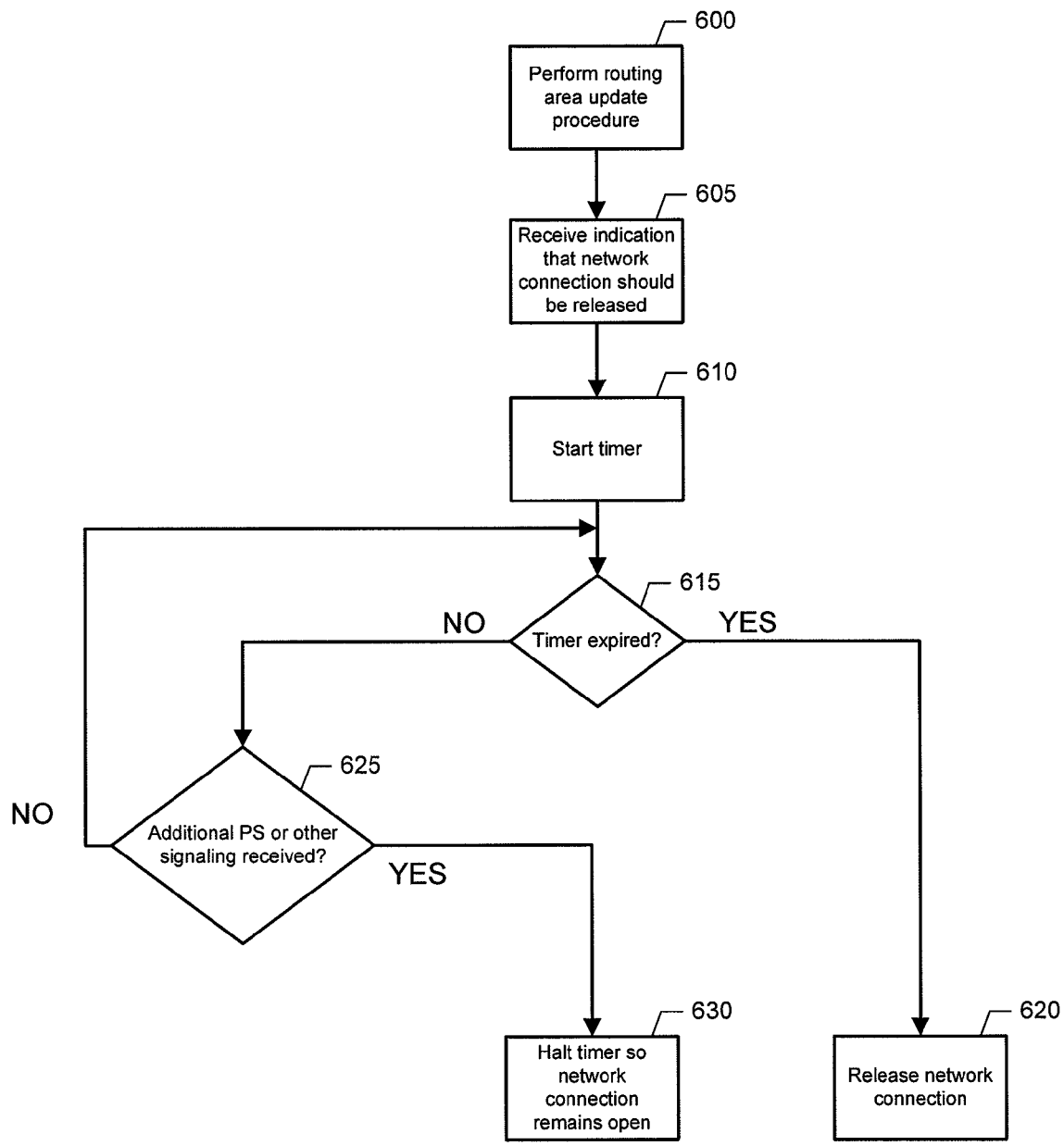
FIG. 6 is a flowchart in accordance with one embodiment of the present invention.

In light of the foregoing exemplary embodiments, FIG. 6 is a more general flowchart of a method according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described may be embodied by computer program instructions. As will be appreciated, any such computer program instructions may be loaded onto a computer or other programmable apparatus (i.e., hardware), such as the processor of the mobile terminal, to produce a machine, such that the instructions which execute on the computer or other programmable apparatus may create means for implementing the functions specified in the flowchart's block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart's block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

FIG. 6. depicts a flowchart for a method of preserving a connection even after the network has indicated that the connection may be closed. In this regard, the mobile terminal and the network can initially engage in a routing area update procedure as shown in block 600. During or following this procedure, the mobile terminal can receive an indication that the network connection should be released, such as in instances in which the network does not anticipate the need or desire for the exchange of data or other signals in the near future. See block 605. The mobile terminal can then start a timer with the expiration of the timer triggering the mobile terminal to release the connection. See blocks 610, 615 and 620. In instances in which the mobile terminal receives additional PS signaling or other data communications or system signaling prior to the expiration of the timer, the mobile terminal halts the timer such that the network connection remains open to permit the completion of the additional PS signaling or the like. See blocks 625 and 630. As such, embodiments of the present invention permit such unexpected PS signaling or the like to be accomplished during an established network connection, thereby avoiding the inefficiencies and potential latency otherwise introduced by the release and reestablishment of the network connection that is otherwise required by conventional techniques.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving a signal connection release mode indication, the signal connection release mode indication being associated with a signaling connection of a mobile terminal;
initiating a timer based on the signal connection release mode indication, wherein upon expiration of the timer, the signaling connection will be closed;
receiving communication prior to expiration of the timer and subsequent to initiating the timer; and
halting the timer in response to receipt of the communication to prevent expiration of the timer and to correspondingly disallow closing of the signaling connection.

2. The method of claim 1, wherein receiving the signal connection release mode indication includes receiving the signal connection release mode indication, the signal connection mode indication being included in a general packet radio service (GPRS) routing update.

3. The method of claim 1, wherein receiving the signal connection release mode indication includes receiving the signal connection release mode indication, the signal connection mode indication including a follow on proceed bit that indicates a signal connection release mode that is to be implemented.

4. The method of claim 1, wherein receiving the signal connection release mode indication includes receiving the signal connection release mode indication, the signal connection release mode indication being associated with the signaling connection, the signaling connection being a packet switched (PS) signaling connection.

5. The method of claim 1, wherein receiving the communication includes receiving the communication as a series of data packets.

6. The method of claim 1, wherein receiving the communication includes receiving communication as a session management/general packet radio service (GPRS) mobility management protocol data unit (SM/GMM PDU).

7. The method of claim 1 further comprising initiating a closing of the signaling connection upon receipt of an entirety of the communication.

8. An apparatus comprising a processor, the processor configured to:
receive a signal connection release mode indication, the signal connection release mode indication being associated with a signaling connection;
initiate a timer based on the signal connection release mode indication, wherein upon expiration of the timer, the signaling connection will be closed;
receive a communication prior to expiration of the timer and subsequent to initiating the timer; and
halt the timer in response to receipt of the communication to prevent expiration of the timer and to correspondingly disallow closing of the signaling connection.

9. The apparatus of claim 8, wherein the processor configured to receive the signal connection release mode indication includes being configured to receive the signal connection release mode indication, the signal connection mode indication being included in a general packet radio service (GPRS) routing update.

10. The apparatus of claim 8, wherein the processor configured to receive the signal connection release mode indication includes being configured to receive the signal connection release mode indication, the signal connection mode indication including a follow on proceed bit that indicates a signal connection release mode that is to be implemented.

11. The apparatus of claim 8, wherein the processor configured to receive the signal connection release mode indication includes being configured to receive the signal connection release mode indication, the signal connection release mode indication being associated with the signaling connection, the signaling connection being a packet switched (PS) signaling connection.

12. The apparatus of claim 8, wherein the processor configured to receive the communication includes being configured to receive the communication as a series of data packets.

13. The apparatus of claim 8, wherein the processor configured to receive the communication includes being configured to receive the communication as a session management/general packet radio service (GPRS) mobility management protocol data unit (SM/GMM PDU).

14. The apparatus of claim 8, wherein the processor is further configured to initiate a closing of the signaling connection upon receipt of an entirety of the communication.

15. The apparatus of claim 8 further comprising a computer-readable storage medium, the computer-readable storage medium configured to store the signal connection release mode indication.

16. A computer program product comprising at least one computer-readable storage medium having executable computer-readable program code instructions stored therein, the computer-readable program code instructions comprising:
first program code instructions configured to receive a signal connection release mode indication, the signal connection release mode indication being associated with a signaling connection;
second program code instructions configured to initiate a timer based on the signal connection release mode indication, wherein upon expiration of the timer, the signaling connection will be closed;
third program code instructions configured to receive a communication while the timer is running and subsequent to initiating the timer; and
fourth program code instructions configured to halt the timer in response to receipt of the communication to prevent expiration of the timer and to correspondingly disallow closing of the signaling connection.

17. The computer program product of claim 16, wherein the first program code instructions configured to receive the signal connection release mode indication includes being configured to receive the signal connection release mode indication, the signal connection mode indication being included in a general packet radio service (GPRS) routing update.

18. The computer program product of claim 16, wherein first program code instructions configured to receive the signal connection release mode indication includes being configured to receive the signal connection release mode indication, the signal connection mode indication including a follow on proceed bit that indicates a signal connection release mode that is to be implemented.

19. The computer program product of claim 16, wherein the first program code instructions configured to receive the signal connection release mode indication includes being configured to receive the signal connection release mode indication, the signal connection release mode indication being associated with the signaling connection, the signaling connection being a packet switched (PS) signaling connection.

20. The computer program product of claim 16, wherein the first program code instructions configured to receive the communication includes being configured to receive the communication as a series of data packets.

21. The computer program product of claim 16, wherein the third program code instructions configured to receive the communication includes being configured to receive the communication as a session management/general packet radio service (GPRS) mobility management protocol data unit (SM/GMM PDU).

22. The computer program product of claim 16, wherein the computer-readable program code instructions further comprise fifth program code instructions configured to initiate a closing of the signaling connection upon receipt of an entirety of the communication.

23. An apparatus comprising:
means for receiving a signal connection release mode indication, the signal connection release mode indication being associated with a signaling connection;
means for initiating a timer based on the signal connection release mode indication, wherein upon expiration of the timer, the signaling connection will be closed;
means for receiving a communication prior to expiration of the timer and subsequent to initiating the timer; and
means for halting the timer in response to receipt of the communication to prevent expiration of the timer and to correspondingly disallow closing of the signaling connection.

24. The apparatus of claim 23, wherein means for receiving the signal connection release mode indication includes means for receiving the signal connection release mode indication, the signal connection mode indication being included in a general packet radio service (GPRS) routing update.

* * * * *